United States Patent [19]
Ho et al.

[11] Patent Number: 5,658,644
[45] Date of Patent: Aug. 19, 1997

[54] LIGHT WEIGHT BOARD OF IMPROVED MECHANICAL STRENGTH AND MANUFACTURE THEREOF

[75] Inventors: Ding Shyan Ho, Pinebrook; Jyh-yao Raphael Li, Parsippany, both of N.J.

[73] Assignee: Inteplast Corporation, Livingston, N.J.

[21] Appl. No.: 567,747

[22] Filed: Dec. 5, 1995

[51] Int. Cl.$^6$ ............................. B32B 3/20; B29C 47/00
[52] U.S. Cl. ..................... 428/188; 428/120; 428/167; 428/213; 264/148; 264/176.1; 264/177.1; 264/177.17; 264/209.1; 264/209.3; 264/210.4; 264/211.12
[58] Field of Search ........................ 428/178, 188, 428/192, 167, 120, 131, 213; 264/177.1, 148, 154, 159, 176.1, 177.17, 209.1, 209.3, 209.4, 210.4, 211.12

[56] References Cited

U.S. PATENT DOCUMENTS

| | | | |
|---|---|---|---|
| 3,274,315 | 9/1966 | Kawamura | 428/188 |
| 3,748,214 | 7/1973 | Withers | 428/188 |
| 3,792,951 | 2/1974 | Meyers | 425/326 |
| 3,941,157 | 3/1976 | Barnett | 428/188 |
| 4,513,048 | 4/1985 | Kaube et al. | 428/188 |
| 4,647,489 | 3/1987 | Siol et al. | 428/188 |

*Primary Examiner*—Donald Loney
*Attorney, Agent, or Firm*—Kenneth P. Glynn

[57] ABSTRACT

An extruded hollow plastic board is described which has a pair of flat and parallel sheets spaced apart and interconnected by longitudinally extending ribs. The ribs and sheets are connected with rounded joint areas, which significantly improve the mechanical properties and solve undercut and die line problems existing with prior art hollow plastic boards. This invention also provides a method for the manufacture of the hollow board of thermoplastic resin thereof.

6 Claims, 2 Drawing Sheets

LIGHT WEIGHT BOARD OF IMPROVED MECHANICAL STRENGTH AND MANUFACTURE THEREOF

BACKGROUND OF THE INVENTION

1. Field of Invention

The present invention relates to thermoplastic sheeting consisting of a pair of sheets or layers spaced apart and interconnected by longitudinally extending ribs so that the interior of the sheeting contains a plurality of longitudinally extending passageways. More particularly, it relates to thermoplastic sheeting having improved joint structures at the contacting points of the sheets and ribs which enhance the tear strength, flat crash resistance and cross elongation of the sheeting. The present invention also relates to the process for production thereof.

2. Description of the Prior Art

Hollow light weight panels made of thermoplastic resin which may be used to replace paper corrugated board are already known to those skilled in the art. A prior art method for the manufacture of hollow structure boards is to integrally mold a sheet with a plurality of ribs extending from the surface of the sheet and then laminate another sheet of thermoplastic resin to the tops of the ribs by bringing the sheet and the tops of the ribs together under heat-softened conditions such that they heat bond to one another. There is, however, an inherent drawback to the prior technique in that only a slight pressure may be applied when the constituents are united together by fusion state connection at their mutually contacting parts. As a result, the fusionally solidified joints of the constituent members represent naturally weaker points than other parts of the thus produced panel or board.

To overcome the problem of weak joints in the prior art technique, it is preferred to integrally extrude the two sheets and the plurality of ribs of the hollow plastic board through an extrusion orifice having a corresponding orifice configuration. This process was previously described in U.S. Pat. Nos. 3,274,315 and 3,792,951. Among the various types of hollow boards of thermoplastic resin as described in U.S. Pat. No. 3,274,315, the embodiment consisting of a pair of sheets or layers which are flat and substantially parallel, spaced apart and interconnected by longitudinally extending ribs, which are substantially vertical to the two flat sheets, is the most widely used, since this embodiment has good flat crush resistance and uses less thermoplastic material. However, undercuts regularly occur at the joint area of the two flat sheets and the longitudinally extending ribs of this configuration. Die lines are also often observed at the joint areas since the deposition of carbon easily occurs at the corner of the mandrels of the die. Both the undercuts and die lines deteriorate the tear strength, flat crush resistance and cross elongation of the hollow boards of the thermoplastic resin.

In order to overcome the foresaid shortcomings and to further improve the mechanical strength of the hollow thermoplastic resin board mentioned above, a renovation of the joints of the ribs and flat sheets of the board and its corresponding extrusion process are disclosed in this invention which is neither taught nor rendered obvious by the prior art.

SUMMARY OF THE INVENTION

An extruded hollow plastic board is described which has a pair of flat and parallel sheets spaced apart and interconnected by longitudinally extending ribs. The ribs and sheets are connected with rounded joint areas, which significantly improve the mechanical properties and solve undercut and die line problems existing with prior art hollow plastic boards. This invention also provides a method for the manufacture of the hollow board of thermoplastic resin thereof.

BRIEF DESCRIPTION OF THE DRAWINGS

The features of the present invention, which are believed to be novel, are set forth with particularity in the appended claims. The invention may best be understood by reference to the following description taken in conjunction with accompanying drawings, wherein like reference numerals identify like elements, and wherein:

DETAILED DESCRIPTION OF THE PRESENT INVENTION

Figure 1:
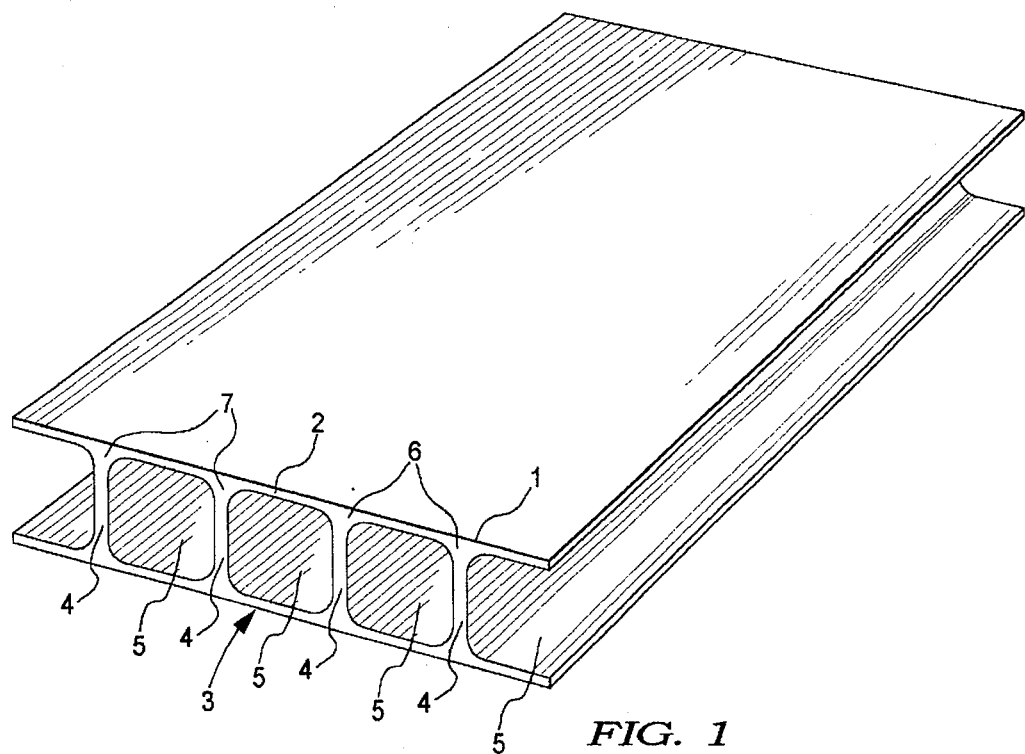
FIG. 1 is a perspective view of parts of the hollow board of thermoplastic resin with rounded joint area at the contacting point of the flat sheet and ribs of this invention.
Figure 2:
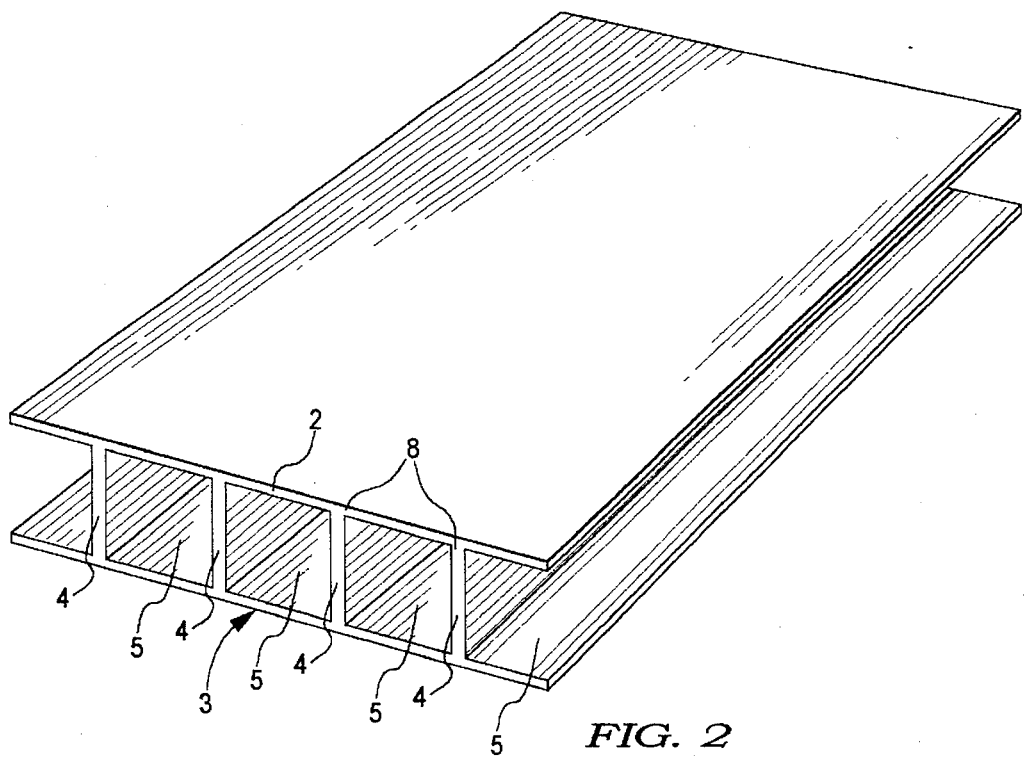
FIG. 2 is a perspective view of the hollow plastic board manufactured by conventional die which illustrates undercuts at the contacting points of the sheets and ribs.

Hollow thermoplastic resin board can be easily prepared with equipment well known to those skilled in the Art, including an extruder for extruding thermoplastic materials, provided with a suitably modified die head, as well as devices for shaping and cooling the extruded shapes thus obtained. Initially, the thermoplastic material is extruded from an extruder to flow through an extrusion die having a corresponding orifice configuration to form hollow board of thermoplastic resin. After the board leaves the extruder, the board is shaped in a sizer section which vacuum shaping and cooling the plastic board. Finally, the board is surface treated and cut into sections of desired length. FIG. 1 illustrates a present invention thermoplastic resin board (1) with rounded joint areas at the contacting points of the flat sheets and ribs of this invention. The board consists of a first planar sheet (2) and a second planar sheet (3) which is substantially parallel to the first planar sheet (2) with the inwardly facing surfaces of the two sheets integrally interconnected by a plurality of longitudinally extending ribs (4). Within the sheeting, the combination of the inwardly facing surfaces of the sheets (2) and (3) and the adjacent surface of a pair of ribs (4) define elongated and rectangular ducts or passageways (5). The four corners (6) of the rectangular passageways are rounded. Therefore, the joint area (7) where the rib (4) and sheet (2) or (3) are connected is a rounded joint area confined by the two arcs of the rounded corners of the passageway and the flat surface of the sheet. The present invention renovates the joint area from traditional prior art, T-shaped joints shown in FIG. 2, to rounded, which, as a result, significantly improves the tear strength, flat cash resistance and cross elongation of the hollow board of thermoplastic resin. (FIG. 2 shows prior art configuration, but with components described in FIG. 1 being identically numbered). In addition, the present invention shown in FIG. 1 overcomes the problem of undercut (8) (as shown in FIG. 2) and the die line problem which occur regularly during production of conventional boards with T-shaped joint area.

Out of the wide range of thermoplastic materials which may be used for preparing the extruded shapes according to this invention, the following ones may be cited by way of illustrative, but not limited, for example: polyolefins, among which polypropylene and polyethylene, filled polyolefins (filled with materials such as talc, calcium carbonate, mica, and other fillers known in these products, as well as mixtures of filled materials) and their copolymers; polystyrene and styrene copolymers of various kinds; acrylic resins; polycarbonates; polyethylene terephthalate and its copolymers.

Figure 3:
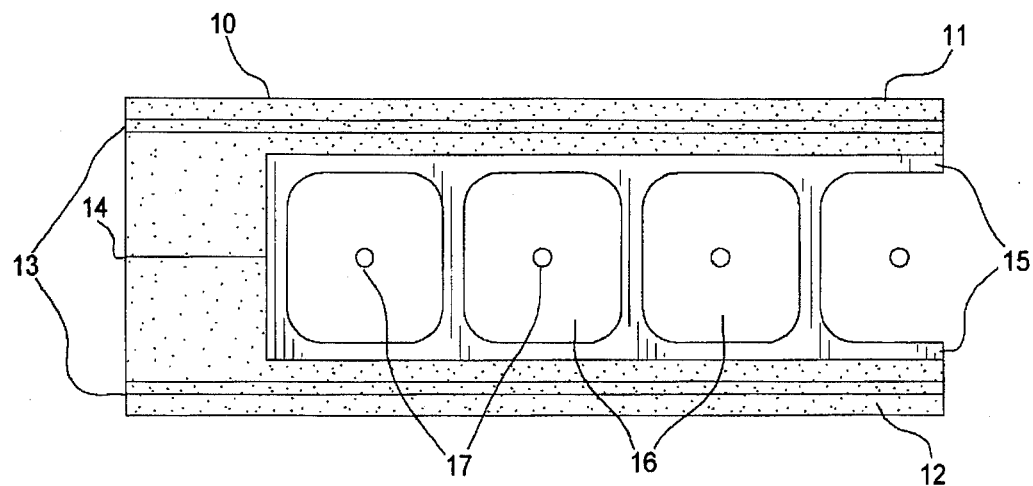
FIG. 3 is a sectional view of pans of the modified die design with corner modification on the mandrels.

In order to produce boards mentioned above, the die section of the extrusion process has to be modified accordingly. FIG. 3 illustrates the die section (10) which produces the rounded joint areas at the contacting points of the flat sheets and ribs of this invention. The die section (10) contains upper and lower die sections (11), (12), each having an electrical heater (13). Die sections (11), (12) are secured together in face-to-face relationship along line (14), to form die cavity (15) therebetween. The cross-section of cavity (15) corresponds to the external shape of the board (1). Die sections (11), (12) are provided with cutouts which receive mandrels (16).

The mandrels (16) are connected to a transverse mandrel holder which secures and positions the mandrels (16) across cavity (15). Longitudinal bores (17) in mandrels (16) are connected to a transverse bore in the mandrel holder which extends transversely through the mandrel holder and communicates with venting facilities which provides air flow through the passageways of the board during extrusion.

Figure 4:
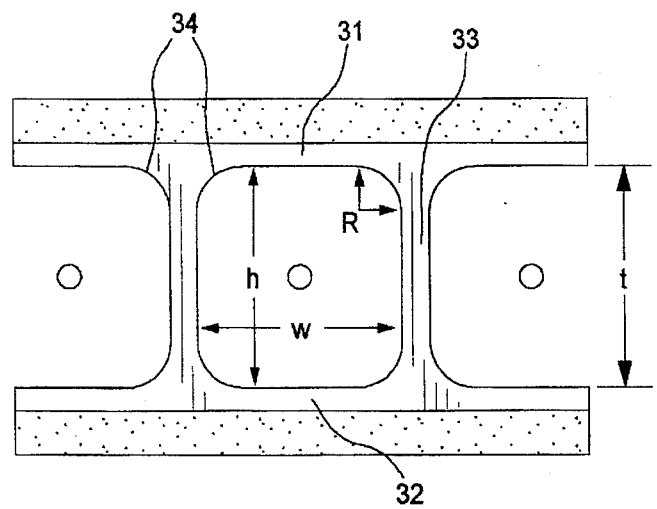
FIG. 4 is an enlarged sectional view of parts of the die section illustrating the modification of the mandrels of the die.

Referring now to FIGS. 1 and 4, in order to have a hollow thermoplastic resin board of strong mechanical strength and an economic usage of the thermoplastic resin, cavities (31) and (32), which correspond to the formation of sheet (2) and (3) of the board (1) shown in FIG. 1, generally have gaps ranging from about 2.5 to about 15% of the total gap between upper and lower die sections t and the cavity (33) between two adjacent mandrels (16) which corresponds to the formation of the rib (4) of the board has a gap between about 5 and about 20% of t. The width w and height h of the mandrels (16) which form the passageways (5) of the board are generally about 60–95% and about 50–300%, respectively, of the total gap between upper and lower die sections t. In order to have rounded joint areas (7), the corners of the mandrels are rounded by circles of radius R which is shown in FIG. 4. It is very critical that the diameter of the round corners (34) of the mandrel should satisfy the following expression $$0.01\,(w+h) \leq 2R \leq 0.15\,(w+h) \qquad (I)$$

If the diameter is below this range, the round corner modification is not able to avoid undercuts which occur to the joint area of the rib and the flat sheet, and the improvements of the tear strength, flat crush resistance and cross elongation of the hollow thermoplastic board are insignificant. In the case that the diameter is above this range, the sheets (2) and (3) will not be flat and even, and the ribs (4) will not be straight and vertical to sheets (2) and (3) since the joint areas (7) which contain too much thermoplastic material have much slower cooling rates than the cooling rates of the ribs and sheets. As a result, the esthetics and flat crush resistance of the boards are affected.

After the die section, the hollow board of thermoplastic material enters a sizer section to be cooled and finally shaped. The dimensions of the hollow board will be slightly different from the dimensions of the die after the sizer section, however, the dimensions of the board will be within the range specified for the die mentioned above.

Though the present invention has been described with circular-shaped corners of the mandrels to form the rounded joint area of the hollow plastic board, modifications and variations of the corners of the mandrels and the corresponding rounded joint areas may resorted to those skilled in the art in light of the above teachings, without departing from the spirit and scope of this invention. Such modifications and variations are considered to be within the purview and scope of the appended claims. For example, serial cuts Which would represent are segments, such as shown in FIG. 5, would be within the purview of the present invention.

Figure 5:
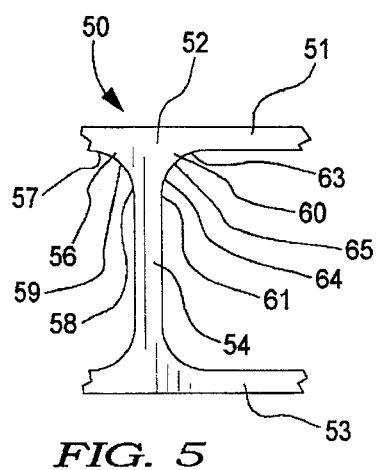
FIG. 5 is an enlarged sectional view of parts of the hollow board of thermoplastic resin which illustrates modifications of the rounded joint area at the contacting point of the flat sheet and rib.

Thus, FIG. 5 shows a partial cut view of corners of a board (50) such as is shown in FIG. 1, except that there are rounded joint areas having curves which are not smooth, but are equivalent. The sheet (51) has present invention, rounded joint area (52) with rib (54) and bottom sheet (53) as shown. The corner (56) has rounded arcs (57) and (58) and a straight segment (59). Likewise, corner (60) has curved and lined portions, more specifically, has arcs (61) and (63) and straight segments (64) and (65). These together have an average or equivalent radius $R_2$, which mathematically satisfies formula (I) above.

The properties of the thermoplastic resin and the hollow board produced by the present invention, described in conjunction with the Examples below, were determined by the following methods:

Melt Flow Rate: ASTM-D 1238—At 2.16 Kg measured at 230° C., reported as grams per 10 minutes.

Tear Strength: ASTM-D 1938—A strip of thermoplastic board 75 mm (3 in.) long by 25 mm (1 in.) wide has a clean longitudinal slit 50 mm (2 in.) long cut which cuts the strip into two tongues. Secure one tongue in one grip and the other in the other grip of the constant-rate-of-grip separation-testing machine, using an initial grip separation of 50 mm. Use a grip-separation speed of 250 mm/min., start the machine and record the load necessary to propagate the tear through the entire unslit 25-mm portion. Reported as the force in grams.

Flat Crush Resistance: TAPPI-T 825—The test is performed on a compression testing machine having an upper and lower platen, one rigidly supported and the other driven. The hollow board of thermoplastic resin is cut in circular form of 32.3 cm$^2$ in area. The specimen is positioned centrally on the lower platen. Apply the crushing load to the specimen until the ribs of the boards collapse completely. Failure is defined as the maximum load sustained before complete collapse. Reported as the force per unit area.

Edge Crush Resistance: TAPPI-T 811—The test is performed on a compression testing machine as mentioned in the previous test. The hollow board of thermoplastic resin is cut into a strip 51 mm (2 in.) wide by 32 mm (1.25 in.) high. The width edges are parallel to each other and perpendicular to the axis the passageways. Place the specimen centrally on the bottom platen with the passageways held perpendicular to the platen. Apply a compressive force to the specimen until it fails and record the maximum load.

Cross Elongation Percentage: Strips 25 mm (1 in.) wide by 76 mm (3 in.) long are cut from hollow board of thermoplastic resin. The width edges which are parallel to the axis the passageways are clamped in the two grips of a constant-rate-of-grip separation-testing machine at a 51 mm (2 in.) gauge length and deformed at a grip separation speed of 51 mm/min. Elongation percentage is the ratio of the extension at the moment of rupture of specimen to the initial gauge length of specimen.

EXAMPLES

The present invention will now be explained by the following examples. The following examples are illustrative of the present invention and are not included as a limitation of the scope thereof.

To ascertain the superior properties of the hollow boards of thermoplastic resin of this invention, boards were manufactured from two grades of block copolymer polypropylene with modified and unmodified dies of the same dimensions. The boards were produced using the above-mentioned extrusion process with the same operating conditions. The properties of the boards obtained were measured by methods described above.

EXAMPLE 1

In the Example, block copolymer polypropylene which has a melt flow rate of 1.8 g/10 min. and ethylene content of about 10% was extruded through a conventional die without corner modification. The extrusion temperatures were between 170° and 210° C. and the temperatures of the die range from 200° to 220° C. The temperatures across the die are usually higher in the edge sections and about 2° to 10° C. lower in the middle section. The board was later vacuum shaped and cooled at a temperature about 20° C. in a calibrator (sizer section). The board produced, as shown in FIG. 2, has a thickness of 3.09 mm and the weight per square meter is 614 grams.

EXAMPLE 2

In this Example, the same block copolymer polypropylene as in Example 1 was used. The polypropylene was extruded through a die, which is of the same dimension of the die used in Example 1 and has the present invention corner modifications of the mandrels. The same operation conditions as in Example 1 are used. The present invention board produced which has a triangle like joint area at the connecting point of the flat skin sheet and rib has a thickness of 3.06 mm and the weight per square meter is 611 grams.

It was observed that with the same thickness and trait weight, board with a rounded joint area at the contacting point of the flat skin sheet and rib has 180, 240 and 40% increase of tear strength, cross elongation percentage and flat crush resistance, respectively over the traditional board in Example 1. The edge crush resistance tests showed, a 15% improvement.

EXAMPLE 3

In this Example, block copolymer polypropylene which has a melt flow rate of 1.8 g/10 min. and ethylene content of about 17% was extruded under similar operation condition as in previous two examples. A die which has a different dimension from the die in Example 1 and does not have corner modification was used to produce hollow board having thickness of 6.10 mm and weight per square meter of 1409 grams.

EXAMPLE 4

In this Example, the same block copolymer polypropylene as in Example 3 was used. The polypropylene was extruded through a die, which is of the same dimension of the die used in Example 3 and has corner modifications of the mandrels. The same operation conditions as in Example 3 were used. The board produced which has a rounded joint area at the connecting point of the flat skin sheet and rib has a thickness of 5.97 mm and the weight per square meter is 1428 grams.

It was observed that significant improvement on tear strength, cross elongation percentage and flat crush resistance are obtained for thicker boards by the modification of the joint area at the contacting point of the flat skin sheet and rib of the board and process for production thereof.

Obviously, numerous modifications and variations of the present invention are possible in light of the above teachings. It is therefore understood that within the scope of the appended claims, the invention may be practiced otherwise than as specifically described herein.

What is claimed is:

1. A hollow plastic board of thermoplastic material, which consists essentially of:

a first planar sheet and a second planar sheet disposed in substantially parallel spaced relation to one another and with a single row of a plurality of laterally spaced coextruding ribs extending between the first and second planar sheets and having connecting points where each rib connects to said first planar sheet and to said second planar sheet, and forming in combination with the sheets, a single row of a plurality of elongated lateral passageways through the sheeting, and having a rounded joint area at each of said connecting points of said planar sheets and said rib, said rounded joint area at each of said connecting points significantly improving the mechanical properties of said hollow plastic board, and eliminating undercut and die line problems during production, said elongated lateral passageways have a predetermined height h and a predetermined width w, and said rounded joint areas having a predetermined radius R which is defined by the following formula:

$$0.01\ (w+h) \leq 2R \leq 0.15\ (w+h).$$

2. The board of claim 1 wherein said board has a predetermined total thickness from the top of said first planar sheet to the bottom of said second planar sheet of thickness t, and each planar sheet has a thickness ranging from about 2.5% to about 15% of t.

3. The board of claim 1 wherein said board has a predetermined total thickness from the top of said first planar sheet to the bottom of said second planar sheet of thickness t, and each rib has a thickness of about 5% to about 20% of t.

4. A process for the manufacture of a hollow plastic board having significantly improved mechanical properties and eliminated undercut and die line problems, which comprises the steps of:

(a) continuously extruding a thermoplastic resin through a die containing upper and lower die sections which have cutouts to receive mandrels having rounded corners so as to form a first planar sheet and a second planar sheet disposed in substantially parallel spaced relation to one another and with a single row of a plurality of laterally spaced coextruding ribs extending between the first and second planar sheets and having connecting points where each rib connects to said first planar sheet and to said second planar sheet, and forming in combination with the sheets, a plurality of elongated lateral passageways through the sheeting, and having a rounded joint area at each of said connecting points of said planar sheets and said rib, said rounded joint area at each of said connecting points significantly improving the mechanical properties of said hollow plastic board, and eliminating undercut and die line problems during production, said elongated lateral passageways have predetermined height h and a predetermined width w, and said rounded joint areas having a predetermined radius R which is defined by the following formula:

$$0.01\ (w+h) \leqq 2R \leqq 0.15\ (w+h);$$

(b) continuously injecting air into passageways formed by the extruding resin;

(c) vacuum shaping and cooling the hollow plastic board; and, (d) cutting the board into sections of desired length.

5. The process of claim 4 wherein said upper and lower die sections form a space having a predetermined total thickness from the top of said lower die to the bottom of said upper die of thickness t, and each space above and below said mandrel has a thickness ranging from about 2.5% to about 15% of t.

6. The process of claim 4 wherein said upper and lower die sections form a space having a predetermined total thickness from the top of said lower die to the bottom of said upper thickness t, and each side between each mandrel has a thickness of about 5% to about 20% of t.

* * * * *